US011242810B2

United States Patent
Hedman

(10) Patent No.: US 11,242,810 B2
(45) Date of Patent: Feb. 8, 2022

(54) METHOD AND DEVICE FOR INCREASED EXHAUST GAS TEMPERATURE IN A DIESEL ENGINE

(71) Applicant: Hedman Ericsson Patent AB, Flen (SE)

(72) Inventor: Mats Hedman, Sparreholm (SE)

(73) Assignee: HEDMAN ERICSSON PATENT AB, Flen (SE)

(*) Notice: Subject to any disclaimer, the term of this patent is extended or adjusted under 35 U.S.C. 154(b) by 0 days.

(21) Appl. No.: 17/298,862

(22) PCT Filed: Dec. 13, 2019

(86) PCT No.: PCT/SE2019/051283
§ 371 (c)(1),
(2) Date: Jun. 1, 2021

(87) PCT Pub. No.: WO2020/122807
PCT Pub. Date: Jun. 18, 2020

(65) Prior Publication Data
US 2021/0355888 A1    Nov. 18, 2021

(30) Foreign Application Priority Data
Dec. 14, 2018    (SE) .................................... 1851587-4

(51) Int. Cl.
*F02D 41/02*    (2006.01)
*F02D 13/02*    (2006.01)
(Continued)

(52) U.S. Cl.
CPC ..... *F02D 41/0245* (2013.01); *F02D 13/0234* (2013.01); *F02D 15/04* (2013.01);
(Continued)

(58) Field of Classification Search
CPC .... F02D 13/0234; F02D 15/04; F02D 35/023; F02D 41/0002; F02D 41/0245; F02D 41/027; F02D 2041/001; F02D 2200/703
See application file for complete search history.

(56) References Cited

U.S. PATENT DOCUMENTS

| 5,303,686 A * | 4/1994 | Kanesaka | ................. F01L 1/08 |
| | | | 123/568.14 |
| 6,279,550 B1 * | 8/2001 | Bryant | .................... F02B 33/06 |
| | | | 123/559.1 |

(Continued)

FOREIGN PATENT DOCUMENTS

| DE | 26 26 833 | 12/1977 |
| DE | 38 37 660 | 5/1990 |
| SE | 1500404 | 4/2017 |

OTHER PUBLICATIONS

International Search Report and Written Opinion regarding Appl. No. PCT/SE2019/051283, dated Feb. 5, 2020, 11 pps.

*Primary Examiner* — Audrey B. Walter
(74) *Attorney, Agent, or Firm* — Foley & Lardner LLP

(57) ABSTRACT

The present invention relates to a method for increased exhaust gas temperature and emission reduction at partial loads in a diesel engine, wherein said engine comprises a cylinder with a reciprocating piston, a variable compression volume (VCR), and at least one exhaust valve and at least one inlet valve, the latter being equipped with variable valve timing (WT). According to the prevailing engine power requirement, an engine control system determines when to open and close said inlet valve, and the size of said compression volume in order to achieve a sufficiently elevated exhaust gas temperature so that correct exhaust gas purification can be achieved. The method is characterized in that the cylinder pressure during the expansion stroke is managed by the engine control system by means of the VCR and (Continued)

VVT functions, such that said pressure reaches atmospheric or sub atmospheric levels at or before bottom dead centre, at engine loads at or below 25% of the maximum engine load, whereby the inlet valve is opened to allow air to mix with the combustion gases. The invention also relates to a corresponding device and a diesel engine comprising said device.

11 Claims, 2 Drawing Sheets

(51) Int. Cl.
     *F02D 15/04*     (2006.01)
     *F02D 41/00*     (2006.01)
     *F02D 35/02*     (2006.01)

(52) U.S. Cl.
     CPC ....... *F02D 35/023* (2013.01); *F02D 41/0002* (2013.01); *F02D 41/027* (2013.01); *F02D 2041/001* (2013.01); *F02D 2200/703* (2013.01)

(56) References Cited

U.S. PATENT DOCUMENTS

2005/0284444 A1   12/2005   Sherman
2011/0174249 A1    7/2011   Bression

* cited by examiner

METHOD AND DEVICE FOR INCREASED EXHAUST GAS TEMPERATURE IN A DIESEL ENGINE

TECHNICAL FIELD

The present invention relates to a method for providing an increased exhaust temperature and/or lowered emission during engine part load in a diesel engine and a device for carrying out the method.

BACKGROUND

It is widely known that emissions control in vehicles with diesel engines works poorly at lower speeds such as for example in city traffic or during frequent starts and stops. This is particularly valid during startup and initial driving with a cold engine.

In a publication from the Swedish Transport Administration regarding emissions control, Chapter 11, from October 2012, the following describes the background, the state of the art and the problems with the diesel engines of today in a sufficient and complete manner.

We cite:

"11. Emissions Control

Exhaust Gas Emissions and Emissions Control

During combustion in a diesel engine, different types of exhaust gas emissions are formed. The discharge level for some of these are controlled in laws and regulations. Since the laws were introduced, the requirements have been made increasingly strict. The emissions which are controlled are hydrocarbon emissions (HC), carbon monoxide (CO), nitrogen oxides (NOx) and particulates (PM). Carbon dioxide is also emitted during diesel combustion, but this gas is a combustion product which is generated at a quantity which is dependent on the number of carbon atoms in the fuel. Carbon dioxide is a gas which contributes to the green house effect, and if it is produced during combustion of fossil fuel, a tax is to be payed, so-called carbon dioxide tax.

Since a long time back, the basic goal for all engine development concerning emissions has been to reduce the base emissions from the engine, i.e. the emissions which are formed in the combustion system of the engine. This has been very successful over the years using advanced combustion development, injection systems with very high pressures and sequential injections and advanced gas exchange by means of developing of turbo charging systems. This has taken place in combination with an increasingly more advanced electronic control of the engine and its components.

The emission requirements have however become significantly more strict during the last decade, and this has resulted in the development of different types of exhaust aftertreatment systems. These systems reduce the emissions after the engine even further.

One of the most difficult problems is to reduce emissions of particulates and NOx. NOx is a result of oxidation between the oxygen and nitrogen in the air and increases quickly with the combustion temperature. Combustion at high temperatures reduce HC, CO and particulate formation and contributes to lowered fuel consumption, but increases the NOx emissions. Methods for reducing NOx The requirements to reduce NOx emissions from heavy diesel engines have over the years become drastically more strict. From the first emission standard (Euro I 1992) up to today (Euro VI 2013), the limit value has been reduced with 95%.

It has not been possible to achieve this reduction with improved combustion technology, instead it has become necessary to develop separate technical solutions.

Exhaust Gas Recirculation (EGR)

The method is based on that a part of the exhaust gas is cooled and recirculated to the air inlet of the engine and then further into the cylinder. These exhaust gases reduces NOx formation since on the one hand oxygen concentration is reduced, and on the other hand since the exhaust gases cool the gas in the cylinder. This results in a lowered combustion temperature in the flame itself, which reduces the formation of NOx.

The method is efficient, but the amount of recirculated exhaust must be controlled depending on engine speed and load. The disadvantage is that the formation of particulates often increases and the method contributes to higher load on the particulate filter. The technology increases the fuel consumption of the engine somewhat.

SCR—Selective Catalytic Reduction

SCR means that an SCR catalyst is installed after the engine. A tank containing a urea solution is mounted on the vehicle. From the tank, the solution is sprayed into the exhaust pipe before the catalyst. At correct mixture, the nitrogen oxides of the exhaust gas is converted into nitrogen gas and water. The injection of urea is controlled electronically and is varied in dependence of the engine load and speed. Catalytic reduction of NOx implies a conversion to nitrogen ($N_2$) and oxygen ($O_2$) (water: $H_2O$) by the catalyst and a reduction agent added before the catalyst. The most common reduction chemical is ammonia ($NH_3$), normally in the form of urea. Urea (AdBlue®) is stored on the vehicle and is converted to ammonia in connection with the reduction.

A requirement for SCR systems to operate is that the exhaust temperatures are sufficiently high. If the exhaust temperature drops below about 200° C., the SCR system is no longer active, and the reduction of NOx seizes. At about 300° C., the reduction is about 90-95%. Another requirement is that there is sufficient oxygen in the exhaust gas. There are also systems which have air assisted urea injection which on one hand atomizes the urea solution so that the spray is more atomized and used more efficiently. The method also makes sure that the oxygen content in the exhaust are at a suitable level.

In addition to reducing NOx, an SCR catalyst also reduces particulates and HC on diesel engines. HC emissions may be reduced with up to 80% and particulates with 20-30%. Making an SCR system operate involves several technical challenges. A few examples: the complicated handling of urea and dosage thereof, the need for high temperature for the catalyst to operate efficiently, the control of excess ammonia during transient conditions, and the size of the catalyst. Ammonia in surrounding air can cause secondary particulates and for that reason an "ammonia slip catalyst" should also be used. SCR can release more small particulates and is therefore often used combined with a particulate filter.

Reduction of CO and HC Emissions

CO emissions from a diesel engine have caused a relatively small problem since a diesel engine involves a combustion which takes place with excess air. The HC emissions from the engine can however be high during the start and heating phase. During normal operation, these emissions are normally quite low.

CO and HC emissions are however easy to reduce using an oxidation catalyst. This catalyst requires an excess of oxygen in the exhaust gases, and that is just what a diesel engine has. With the help of this oxygen, CO, HC and HC derivatives are oxidized to CO2 and water steam. The weakness is that a certain exhaust temperature is required in order for the catalyst to be active, and this is normally not the case during startup and heating up of the engine. Oxidation catalysts have no effect on total NOx emissions, but oxidizes NO to NO2. This is useful when the oxidation catalyst is used together with a particulate filter (se below "Combinations of these systems"). It is often used combined with EGR technology to reduce hydrocarbon emissions.

Methods to Reduce Particulate Emissions

Particulates are formed in the combustion chamber of the engine, and is thereafter subject to certain growth in the exhaust pipe by means of smaller particles aggregating to form larger particles and condensation of volatile substances. The particles which are very small usually consist of carbon, uncombusted fuel, lubricating oil, metal particles and sulfur compounds. They are cancerogenic and by means of their small size stay in the lungs during breathing in and penetrate therefrom out into the blood stream. They can be transported long distances. The requirements for particulate emissions have therefore been reduced to very low values. In order to reduce particulate emissions from a diesel engine, the engine is provided with a particulate filter which is installed in the exhaust system and physically captures the particles before the exhaust gases leave the exhaust pipe.

Eventually, as the filter is filled with particulates, the flow-through resistance becomes increasingly high with increased fuel consumption as an effect. The collected particles then need to be removed from the filter during a so-called regeneration. There are essentially two methods for this.

Combustion and oxidation of the particles by means of increasing the temperature in a controlled manner such that the carbon in the particles is ignited and is combusted. The second method is based on continuous regeneration. Such systems are called Continuously Regenerating Trap® (CRT®). These filter systems consist of an oxidation catalyst in front of a particulate filter. The function of the catalyst is to oxidize NO to NO2. The consequently formed NO2 oxidizes the carbon catalytically to CO2 and N2. The catalyst also oxidizes HC and CO emissions and is thereby a system which reduces all emissions. The disadvantage with this system is that there over time must be a balance between NO2 and the particulate flow and that the exhaust temperature must be above about 250° C. in order for the catalysts to be active. If these conditions are not fulfilled over time, the particulate filter may be saturated with particles with increased fuel consumption as a result and may in worst case be destroyed. Over time the filter is filled with ash products and then the filter needs to be changed or cleaned. For a normal truck (40 ton long haulage truck), this may be needed after about 300 000 km (depending on use etc.).

In many applications, it may be difficult to reach the temperature requirement, for instance in distribution trucks and garbage trucks with frequent stops, low speed and a lot of idling. Then an active system which increases the exhaust temperature is required. A common system is to inject fuel before the catalyst, which then is combusted catalytically and increases the exhaust temperature. The basic problem with the exhaust temperature being too low for the catalyst to be active may however remain. In these cases, a burner or electrical heating of the system may be added.

In order to meet the emissions legislation, the large manufacturers have chosen to either use EGR technology, SCR technology or a combination of these. Before a new investment, it is therefore recommendable to get informed about the advantages and disadvantages of the technologies and analyze which importance they may have in your own business.

Both the SCR and EGR technologies have their advantages and disadvantages.

Diesel consumption is reduced using SCR technology at about the same level as the amount of injected urea (Euro V about 5%). Assuming that the price of urea is substantially lower than the price of diesel, the overall fuel cost for the vehicle is reduced.

One way to keep the cost for urea down is to have a depot of your own, to which urea is bought in higher quantities at a lower price.

An EGR engine probably requires more frequent changes of engine lubricating oil than an SCR engine due to the recirculated exhaust gases.

The EGR technology is known and proven. It reduces emissions at the source, i.e. the engine. The technology is also successively improved.

SCR is an active aftertreatment system which requires extra supervision and maintenance. As a vehicle owner, you need another product to handle for the operation of the vehicle, and another system to maintain. The weight of the vehicle increases due to the additive, which results in lower payload for the vehicle.

An SCR catalyst requires a lowest operating temperature of about 300° C. in order to operate efficiently. This can be difficult to achieve for instance for vehicles in city traffic, with many starts and stops. When the SCR catalyst is not operating, the NOx emissions will be equivalent with those emitted from a Euro I or Euro II engine.

Since the particulate filter collects ash from fuel and oil, it is advantageous to use fuel with low ash content to increase the life length of the filter.

SCR does not work and (EGR) cannot be used when the engine is heating up, which in reality means that reduction of NOx emissions is none from start until the engine has reached a certain temperature. The development of SCR catalysts aims to achieve operation of the catalyst at lower temperature, and EGR could potentially be used (almost) directly from start. So far, these goals have not been reached however. The choice between emission reduction system should be made taking operating conditions into account in order to get the environmentally best solution, but often basis for such considerations is missing."

SCR thus, as mentioned above, means that an SCR catalyst is placed after the engine. A tank containing an urea solution is mounted on the vehicle. The solution is sprayed from the tank into the exhaust pipe before the catalyst. At correct mixture, the nitrogen oxides of the exhaust gas is converted into nitrogen gas and water. The injection of urea is controlled electronically and is varied in dependence of the engine load and speed. Catalytic reduction of NOx implies a conversion to nitrogen (N2) and oxygen (O2) (water: H2O) by the catalyst and a reduction agent added before the catalyst. The most common reduction chemical is ammonia (NH3), normally in the form of urea. Urea (AdBlue®) is stored on the vehicle and is converted to ammonia in connection with the reduction.

SCR systems only operates when the exhaust temperatures are sufficiently high. If the exhaust temperature drops below about 200° C., the SCR system is no longer active, and the reduction of NOx seizes. At about 300° C., the reduction is about 90-95%.

It is mentioned that HC emissions from the engine can be high during the start and heating phases. During normal operation, these emissions are normally quite low.

CO and HC emissions are easy to reduce using an oxidation catalyst. The weakness is that a certain exhaust temperature is required in order for the catalyst to be active, and this is normally not the case during startup and heating up of the engine.

It is also earlier disclosed that particles are formed in the combustion chamber of the engine, and are thereafter subject to certain growth in the exhaust pipe by means of smaller particles aggregating to form larger particles and condensation of volatile substances. The particles which are very small usually consist of carbon, unburnt fuel, lubricating oil, metal particles and sulfur compounds. They are cancerogenic and by means of their small size stay in the lungs during breathing in and penetrate therefrom out into the blood stream. They can be transported long distances. The requirements for particulate emissions have therefore been reduced to very low values.

Particulate emissions from a diesel engine are handled using a particulate filter in the exhaust system which means that the particles are captured before the exhaust gases leave the exhaust pipe.

Eventually, the flow-through resistance becomes increasingly high with increased fuel consumption as an effect. The particles then need to be removed from the filter during a so-called regeneration. One method is combustion and oxidation of the particles by means of increasing the temperature in a controlled manner such that the carbon in the particles is ignited and is combusted.

Emissions control is thus about reducing NOx, CO, HC and particulate emissions. The exhaust temperature determines if the reduction is to be successful.

The problem inherent with the diesel engines of today is that they have a large volume flow of air compared to the fuel flow which means that the exhaust temperature becomes too low for the emissions control to operate satisfactory.

Today's diesel engines for vehicles normally operate according to the four-stroke principle, wherein combustion air at atmospheric pressure, during turbocharging at a higher pressure, is introduced during the intake stroke without control via for instance throttling, which means that the pressure at the end of the intake stroke, before the compression stroke, is at least atmospheric pressure. At the end of the compression stroke, the amount of fuel needed for the demanded load is injected and combusted, so-called qualitative combustion, and the combustion gases expand in a working stroke during piston work. During the working stroke or at its end, the pressure in the combustion gases can never go beneath the atmospheric pressure which normally is about 1 bar. The lower the engine load, the lower the temperature of the exhaust gases.

One example below based on the atmospheric pressure 1 bar at air temperature 0° C. (273 K) and an effective compression ratio of 16.67, and further, without significance for the inventive concept, that combustion takes place at constant volume at the top dead center of the piston, i.e. as in the Otto cycle, which the diesel engines of today are approaching, and which is relevant when using VVT and VCR in diesel engines with the possibility for so-called quantitative combustion. Numbers for temperatures and pressures and so on are thus theoretical and without the influence of heat losses and friction etc., and are rounded off, but as mentioned without significance for the inventive concept.

A prerequisite for the example below, is that the diesel engine of today during full load is supplied with fuel which gives a temperature increase in the compressed air mass of 2000 degrees.

Consequently, 25% load in a diesel engine of today, in agreement with the formula for combustion at constant volume, results in a temperature increase in the compressed air mass of 0.25*2000=500 degrees. The compression pressure becomes 51.4 bars at temperature of 841.2 K and the compression pressure 81.9 bars at temperature 1341.2 K, and the pressure in the exhaust gas at the end of the working stroke becomes 1.6 bars at exhaust temperature 435K, i.e. 162° C. This is a temperature at which for instance an SCR catalyst, with reference to the Swedish Transport Administration according to above, no longer is active (temperature below 200° C.). At lower engine loads than the exemplified, the exhaust temperature of course becomes even lower. This example confirms the cause to the problems of emissions control.

By significantly increasing the exhaust temperature in vehicles with diesel engines during part loads, such as for instance during lower speeds in city traffic or during traffic with many starts and stops, or during start of a cold engine, efficient emissions control is achieved.

In Swedish patent SE1500404-7, which hereby is incorporated by reference, VCR and VVT (therein referred to as freely controllable valves), variable compression ratio and variable valve timing, respectively, are described. A significantly reduced volume flow of exhaust gas at part loads is made possible, while the exhaust temperature is still high. Hereby, exhaust temperatures required for proper operation of the catalyst is achieved.

SUMMARY

The main object with the present invention is to provide a further improved technology which solves the problems with insufficient emissions control at lower loads. This object is achieved by providing the method and device with the characterizing features indicated in the patent claims.

The present invention concerns a development of combustion technology, a development which earlier has not been possible.

The present invention is a further development of the solution described in SE1500404-7.

According to a first aspect of the invention, there is provided a method for providing high exhaust temperatures and/or lowered emissions at engine part loads, said engine comprising at least one cylinder with a reciprocating piston, has a variable compression volume (VCR), and at least one exhaust valve and at least one intake valve, the intake valve being provided with variable valve timing (VVT). The engine control system of the diesel engine may be configured to, based on the current need for engine power, determine when the intake valve is to open and close, and to which size the compression volume is to be adjusted for the temperature in the exhaust gas at evacuation to be sufficiently high for the cleaning function of the present exhaust aftertreatment. The invention is characterized in that the engine control system controls the functions for VVT and VCR such that the cylinder pressure during the working stroke, at engine loads amounting to 25% or less of said maximum engine load, reaches or falls below the present atmospheric pressure before or when the piston reaches the bottom dead center, wherein the intake valve is opened when the cylinder pressure reaches or falls below the present atmospheric pressure to introduce air to be mixed with combustion gases. This contributes to oxidation of particulates, CO, HC and to an increase in engine work due to the pressure increase in the cylinder. To some extent, a temperature increase of the combustion gases is also obtained due to the increased pressure.

It is understood that providing high exhaust temperatures refers to providing higher exhaust temperatures compared with a conventional diesel engine, i.e. increased exhaust temperature. The above described cylinder pressure which reaches or falls below the present atmospheric pressure can be achieved for instance by controlling VVT and VCR such that intake valves are closed when the amount of combustion air has been supplied which the engine control system has decided is necessary for the desired engine load (according to the so-called early Miller cycle) while at the same time the compression ratio is adjusted by the engine control system for best efficiency. The exhaust valves do not necessarily need to be variable. In embodiments, the above-mentioned arrangement of the engine control system to provide sufficiently high temperature in the exhaust gases at evacuation for the present exhaust aftertreatment technologies intended cleaning function may also be achieved by said early closing of the intake valves and adjustment of the compression ratio for best efficiency. Alternatively, a late closing of the intake valve (after the top dead center according to the so-called later Miller cycle) may be used for the same purposes.

Apart from the above mentioned advantages with addition of air, opportunities for substantially more efficient emissions control during initial evacuation of exhaust gases emerge since the under pressure in the cylinder causes hot exhaust gases to flow back into the cylinder, which also contribute to oxidation of particulates, CO and HC before the exhaust gases are evacuated again.

25% load basically means that introduction of combustion air is interrupted when 25% of the inlet stroke has been completed and that the effective compression ratio 16.67 is initiated when 25% of the compression stroke remains. The compression pressure becomes, as above, 51.4 bars at temperature 841.2 K, but the combustion pressure increases to 173.5 bars at temperature 2841.2 K while the pressure in the exhaust gases at the end of the working stroke becomes 0.5 bars at exhaust temperature 530 K, i.e. 257° C., at which temperature an SCR catalyst is still active. But the most interesting is what the temperature becomes during the working stroke when the pressure passes the atmospheric pressure, here 1 bar, since it is principally at this temperature at which evacuation of the exhaust gases is initiated. At 1 bar, the temperature is 654K, i.e. 381° C., at which temperature the SCR catalyst reduces NOx with about 95%.

At said passing of 1 bar during the working stroke, 40% of the working stroke remains and the lower the engine load, the greater portion of the working stroke remains. For instance at 10% load, the temperature still becomes 654K, and 75% of the working stroke remains at passing of 1 bar.

Consequently, it is the possibility at engine part loads to create a pressure in the combustion, which pressure is lower than the atmospheric pressure, which allows actions for emissions control to be conducted already before the exhaust gases leave the cylinder.

A low mass flow in evacuated exhaust gases compared with the flow in the diesel engines of today, provides a longer residence time in the catalyst and thereby a further improved catalyst function, which contributes to that formed NOx to a certain extent is reduced to nitrogen and oxygen, respectively. Further, a possibility is created to create hot exhaust gases directly at start of a cold engine, with following quick heating of cylinders and exhaust system, which is a substantial advantage since the catalytic action then is initiated almost instantly after start.

In embodiments, the introduced air is heated by a heat exchanger (Interheater™) which for example exchanges heat with exhaust gases. This improves said oxidation and contributes to increased temperature in the mixture which is created. The increased temperature also results in an increased exhaust temperature compared to without heat exchanger.

In embodiments, introduction of air takes place in connection with the start of evacuation, wherein air with high speed flows into the cylinder and effectively mixes with the combustion gases. This can for example be achieved be means of an intake valve with variable valve timing (VVT) which is opened at the same time as the exhaust valve (which does not necessarily need to be variable).

According to a second aspect of the invention, there is provided a device for providing a high exhaust temperature and/or lowered emissions at engine part loads in a diesel engine. The diesel engine comprises at least one cylinder with a reciprocating piston allowing variable compression volume, VCR, and at least one exhaust valve and at least one intake valve, the intake valve being provided with variable valve timing, VVT. The engine control system of the diesel engine may be configured to, based on the current need for engine power, determine when the intake valve is to open and close, and to which size the compression volume is to be adjusted for the temperature in the exhaust gas at evacuation to be sufficiently high for the intended cleaning function of the present exhaust aftertreatment. The engine control system may be configured for carrying out the method according to the first aspect of the invention. The device is characterized in that the pressure in the exhaust gas during the working stroke is controlled by the engine control system, using the functions for VVT and VCR, such that the pressure, at engine loads amounting to 25% or less of the maximum engine load, reaches or falls below the present atmospheric pressure before the piston reaches the bottom dead center, wherein the intake valve is opened and air is introduced.

According to a third aspect of the invention, there is provided a diesel engine comprising at least one cylinder with a reciprocating piston, a variable compression volume, VCR, and at least one exhaust valve and at least one intake valve, the intake valve being provided with variable valve timing, VVT, and an engine control system. The engine control system is configured to, using the functions for VVT and VCR, control the cylinder pressure at engine loads amounting to 25% or less of the maximum engine load such that the cylinder pressure reaches or falls below the present atmospheric pressure before the piston reaches the bottom dead center, and to control the intake valve to open when the cylinder pressure reaches or falls below the present atmospheric pressure, whereby air is introduced. The engine control system of the diesel engine may further be configured to, based on the current need for engine power, determine when the intake valve is to open and close, and to which size the compression volume is to be adjusted for the temperature in the exhaust gas at evacuation to be sufficiently high for the intended cleaning function of the present exhaust aftertreatment.

The above described embodiments of the method are applicable also as corresponding embodiments of the second and third aspects of the invention.

BRIEF DESCRIPTION OF THE DRAWINGS

Above described and other aspects of the invention will now be described in more detail with reference to the enclosed figures showing embodiments of the invention, wherein.

DETAILED DESCRIPTION

Figure 1:
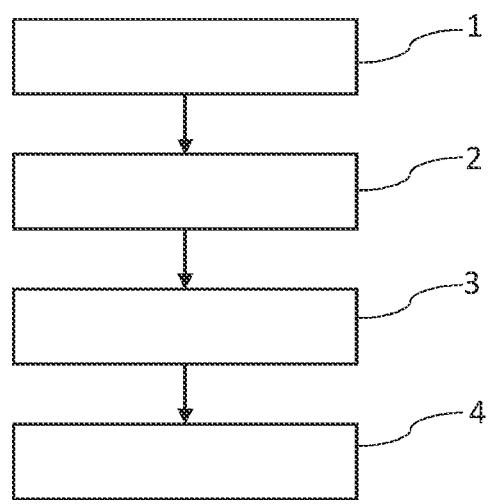
FIG. 1 shows a flow chart illustrating an embodiment of the method according to the first aspect of the invention, and FIG. 2 schematically illustrates an embodiment of a device according to the second aspect of the invention.

FIG. 1 shows a flow chart which schematically illustrates an embodiment of the method according to the first aspect of the invention, where the method comprises, based on the current need for engine power, determine 1 when the intake valve is to open and close, and to which size the compression volume is to be adjusted for the temperature in the exhaust gas at evacuation to be sufficiently high for the intended cleaning function of the present exhaust aftertreatment. The method further comprises using the engine control system to control 2 the functions for VVT and VCR such that, at engine loads amounting to 25% or less of said maximum engine load, the cylinder pressure during the working stroke reaches or falls below the present atmospheric pressure before or when the piston reaches the bottom dead center, wherein the intake valve is opened 4 when said cylinder pressure reaches or falls below said present atmospheric pressure to introduce air which is mixed with combustion gases. Before the air is introduced, it is heated 3 by means of heat exchange with the exhaust gases.

Figure 2:
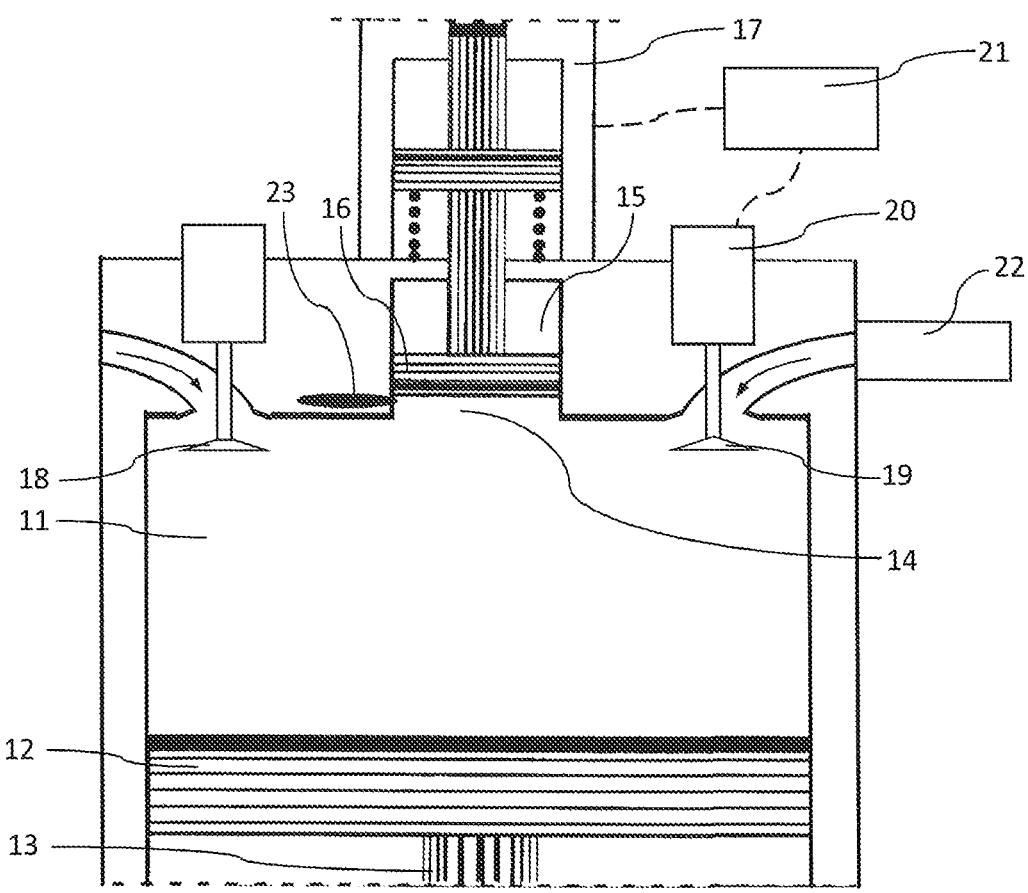

FIG. 2 illustrates an embodiment of a device according to the second aspect of the invention, but could also be considered illustrating parts of an embodiment of a diesel engine according to the third aspect of the invention.

The engine is in a conventional manner provided with a cylinder 11 in which a piston 12 connected to a piston rod 13 moves back and forth. The engine further comprises a variable compression volume 14 formed in the cylinder head in a secondary cylinder 15 which is open downwards towards the cylinder 11 and is provided with a reciprocating secondary piston 16 which allows variable compression volume (VCR). By changing the position of the secondary piston 16, the total volume above the piston 12 is changed. The secondary piston is adjustable by means of the actuator 17. At least one exhaust valve 18 and at least one intake valve 19 is arranged in the cylinder head. At least the intake valve is provided with variable valve timing VVT using the actuator 20. In the figure, the exhaust valve 18 is illustrated with an actuator in a corresponding manner as the intake valve, but this is not necessary. Conventional driving of the exhaust valve using a cam shaft is also possible. Different types of actuators suitable to use as actuators 17, 20 are known and are therefore not described in detail here. An injector 23 is arranged to inject fuel into the variable compression volume 14.

The engine and the device further comprises an engine control system 21 which, based on the current need for engine power, determines when the intake valve 19 is to open and close and also to which size the compression volume 14 is to be adjusted for the temperature in the exhaust gas at evacuation, i.e. when the exhaust valve 18 is opened, is sufficiently high for providing and maintaining of the intended cleaning function of the exhaust aftertreatment (SCR for instance). The engine control system 21 is configured to, using the functions for VVT and VCR (i.e. by controlling the opening and closing times of the intake valve and the position of the secondary piston 16 using the actuators 17, 20), control the cylinder pressure to, at engine loads amounting to 25% or less of the maximum engine load, reach or fall below the present atmospheric pressure before the piston 12 reaches the bottom dead center. The engine control system 21 is further configured to, using the actuator 20, control the intake valve 19 to open when the cylinder pressure reaches or falls below the present atmospheric pressure, whereby air is introduced.

In the figure, it is illustrated when the piston 12 is just above the bottom dead center, i.e. during the end of the working stroke. By means of the control of the engine control system 21, the cylinder pressure is below the present atmospheric pressure at this time. Both the intake and exhaust valves 18, 19 are open such that air is introduced via the intake valve and hot exhaust gases are introduced via the exhaust valve (see the arrows in the figure). The air which is introduced via the intake valve is heated by means of heat exchange with the exhaust gases using a heat exchanger 22 (schematically illustrated).

When the piston 12 eventually starts is movement upwards (after the bottom dead center), the intake valve 19 is closed, while the exhaust valve 18 is kept open to evacuate combustion gases (during the exhaust stroke).

The invention is not limited to the above described embodiments, but modifications may be made within the scope of the appended claims. For instance, the variable compression volume and variable valve timing may be realized in many different ways and with many different types of actuators (pneumatic, hydraulic, electric). The engine control system also does not necessarily need to be configured to operate exactly as described above. For instance, the exhaust valve and the intake valve do not need to be open simultaneously, but the intake valve may be opened and closed before the exhaust valve is opened.

The invention claimed is:

1. A method for providing increased exhaust temperature and lowered emissions at engine part loads amounting to 25% or less of a maximum engine load in a diesel engine, said diesel engine comprising at least one cylinder with a reciprocating piston, a variable compression volume, VCR, at least one exhaust valve and at least one intake valve, the intake valve being provided with variable valve timing, VVT, wherein the method comprises:
    determining, by an engine control system and based on a current need for engine power, when the intake valve is to open and close, and to which size the variable compression volume is to be adjusted for the exhaust temperature of the exhaust gas at evacuation to be sufficiently high for a cleaning function of an exhaust aftertreatment,
    controlling, by the engine control system, using functions for the VVT and VCR, and at the engine part loads amounting to 25% or less of said maximum engine load, the cylinder pressure during a working stroke to reach or fall below a present atmospheric pressure before the reciprocating piston reaches a bottom dead center, and
    opening the intake valve when said cylinder pressure reaches or falls below said present atmospheric pressure to introduce air to be mixed with combustion gases.

2. The method of claim 1, wherein the intake valve is opened for introducing air in connection with initiation of exhaust gas evacuation.

3. The method of claim 1, wherein the introduced air is heated by the exhaust gas in a heat exchanger.

4. The method of claim 3, wherein the intake valve is opened for introducing air in connection with initiation of exhaust gas evacuation.

5. A device for providing increased exhaust temperature and lowered emissions at engine part loads in a diesel engine, said diesel engine comprising at least one cylinder with a reciprocating piston allowing variable compression volume, VCR, at least one exhaust valve, and at least one intake valve, the intake valve being provided with variable valve timing, VVT, wherein the device comprises:

an engine control system configured to:
  based on a current need for engine power, determine when the intake valve is to open and close and to which size the compression volume is to be adjusted for the exhaust temperature of the exhaust gas at evacuation to be sufficiently high for a cleaning function of an exhaust aftertreatment,
  using functions for the VVT and VCR, control a cylinder pressure to, at engine loads amounting to 25% or less of a maximum engine load, reach or fall below a present atmospheric pressure before the reciprocating piston reaches a bottom dead center, and
  control the intake valve to open when said cylinder pressure reaches or falls below said present atmospheric pressure whereby air is introduced.

6. The device of claim 5, wherein said engine control system is configured to control the intake valve such that it is opened when the cylinder pressure reaches or falls below the present atmospheric pressure and in connection with initiation of exhaust gas evacuation.

7. The device of claim 5, further comprising a heat exchanger arranged to raise a temperature of said air which is introduced via the intake valve when said cylinder pressure reaches or falls below said present atmospheric pressure.

8. The device of claim 7, wherein said engine control system is configured to control the intake valve such that it is opened when the cylinder pressure reaches or falls below the present atmospheric pressure and in connection with initiation of exhaust gas evacuation.

9. An apparatus comprising:
  a diesel engine comprising at least one cylinder with a reciprocating piston, a variable compression volume, VCR, at least one exhaust valve, and at least one intake valve, the intake valve being provided with variable valve timing, VVT, and
  an engine control system configured to:
    based on a current need for engine power, determine when the intake valve is to open and close and to which size the variable compression volume is to be adjusted for an exhaust temperature of the exhaust gas at evacuation to be sufficiently high for a cleaning function of an exhaust aftertreatment,
    using functions for the VVT and VCR, control a cylinder pressure to, at engine loads amounting to 25% or less of a maximum engine load, reach or fall below a present atmospheric pressure before the reciprocating piston reaches a bottom dead center, and
    control the intake valve to open when said cylinder pressure reaches or falls below said present atmospheric pressure whereby air is introduced.

10. The apparatus of claim 9, further comprising a heat exchanger arranged to raise a temperature of said air which is introduced via the intake valve when said cylinder pressure reaches or falls below said present atmospheric pressure.

11. The apparatus of claim 9, wherein said engine control system is configured to control the intake valve such that it is opened when the cylinder pressure reaches or falls below the present atmospheric pressure and in connection with initiation of exhaust gas evacuation.

* * * * *